Nov. 24, 1959     H. J. MEEK     2,914,082
FLOAT ACTUATING DEVICE
Filed Nov. 13, 1957     3 Sheets-Sheet 3

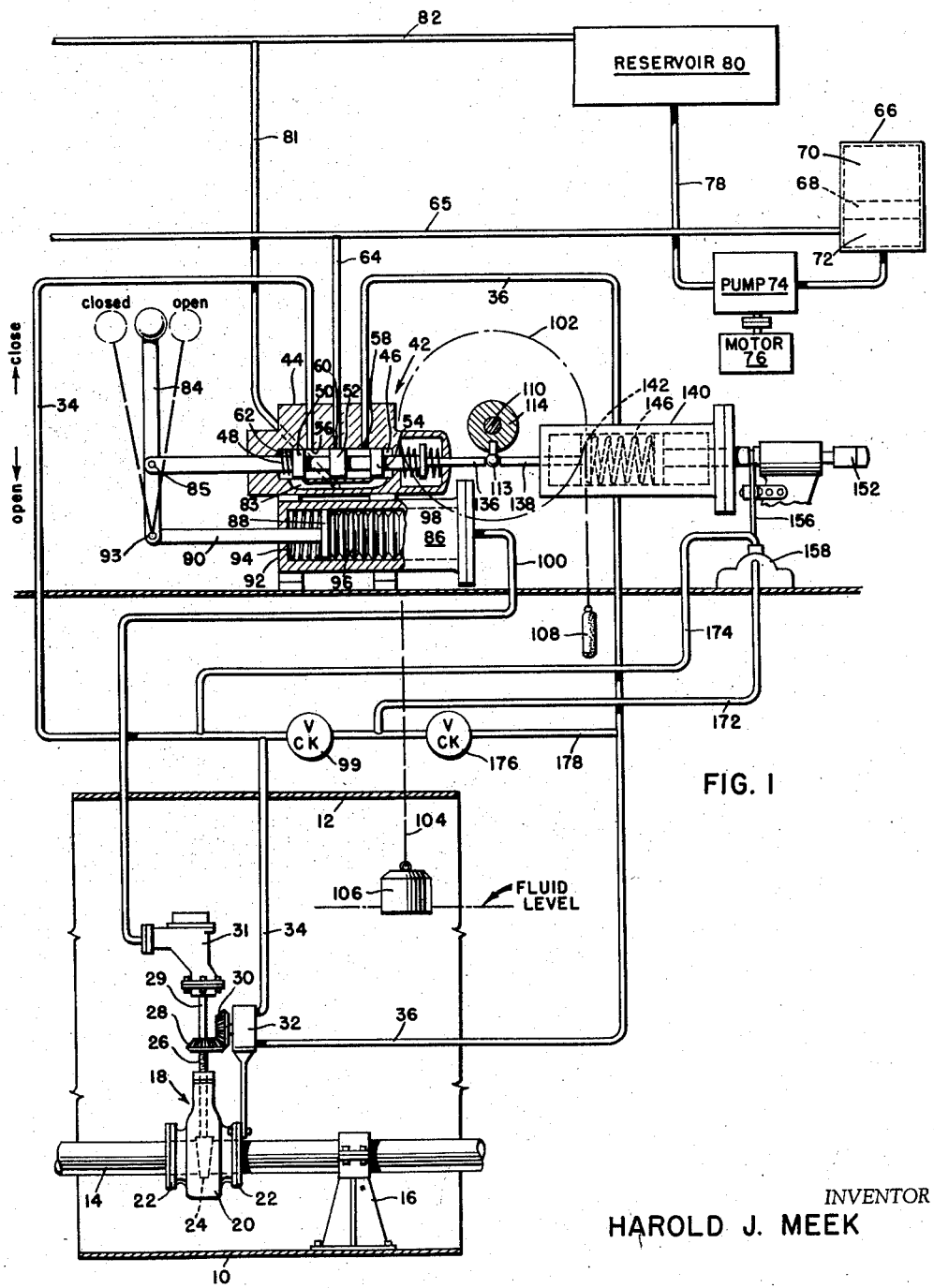
FIG. I
INVENTOR
HAROLD J. MEEK
BY Alvin Browdy
ATTORNEY

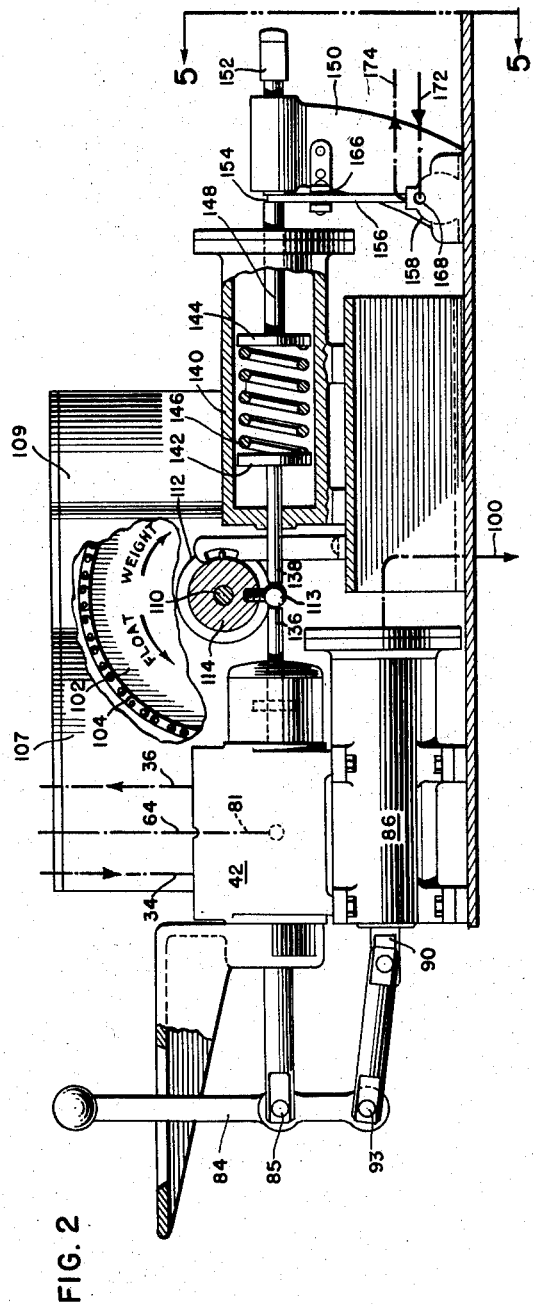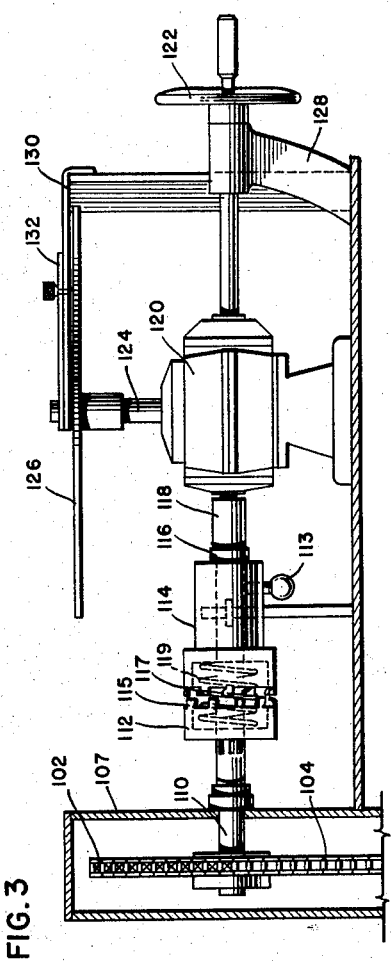

INVENTOR
HAROLD J. MEEK
BY Alvin Browdy
ATTORNEY

United States Patent Office 2,914,082
Patented Nov. 24, 1959

2,914,082

FLOAT ACTUATING DEVICE

Harold J. Meek, Staten Island, N.Y., assignor to Jaroco Engineering Co., Hoboken, N.J., a corporation of New Jersey Application November 13, 1957, Serial No. 696,263

2 Claims. (Cl. 137—412)

The present invention relates to a float actuating device system for controlling a remotely positioned valve.

More particularly, the present invention relates to a float actuating device for controlling the operation of a valve that is located in a position remote from the valve control station, and which device operates to fill a tank to a preselected level and automatically shut the valve when this level has been reached.

Prior to the instant invention, the heretofore known control valves for use in controlling the flow of fluid in remotely positioned fluid conduits for filling tanks in ships have been manually operated, comprising a gate valve in communication with the bore of the fluid conduit and coupled to an elongated stem that extended upwardly from the valve and through the deck of the ship. A control lever or wheel located on the deck of the ship was secured to the valve stem and was adapted to be manually operated to open the remotely positioned valve and then to close the valve when the desired level of liquid was obtained in the tank. These heretofore known manually operated reach valves were objectionable since they were not only difficult to operate by hand due to faulty seating and rusty gears, but in ships that included multiple control valves the operator had to walk to each control station to operate the associated valve. It is seen that during the loading operation of the vessel, the operator would experience difficulty in maneuvering to each valve control station and, in addition, if any of the valves failed to operate, the loading operation would be considerably delayed and the cargo tanks might overflow thus creating a fire hazard. By controlling the remotely positioned valves by a float actuating device, in accordance with the present invention, ease of operation is assured and furthermore a single control station can be provided for all of the remotely positioned valves.

It is an object of the present invention to provide a float actuating device for use in controlling the flow of liquid into a tank in the hold of marine vessels wherein a remotely positioned valve controlled by a control valve is automatically closed by the device when a predetermined level of liquid has been attained in the tank.

Another object of the present invention is to provide a level measuring, indicating and controlling device for use with a tank in the hold of marine vessels.

Other objects and the nature and advantages of the instant invention will be apparent from the following description taken in conjunction with the accompanying drawings, wherein:

Fig. 1 is a diagrammatic illustration of the hydraulic system embodied herein showing a control means located above the deck of a marine vessel for controlling the flow of fluid through a conduit extending into the hold of the vessel.

Fig. 2 is an enlarged elevational view partly in section of a portion of the float actuating device.

Fig. 3 is an enlarged elevational view partly in section of the measuring apparatus.

Figures 4, 5:
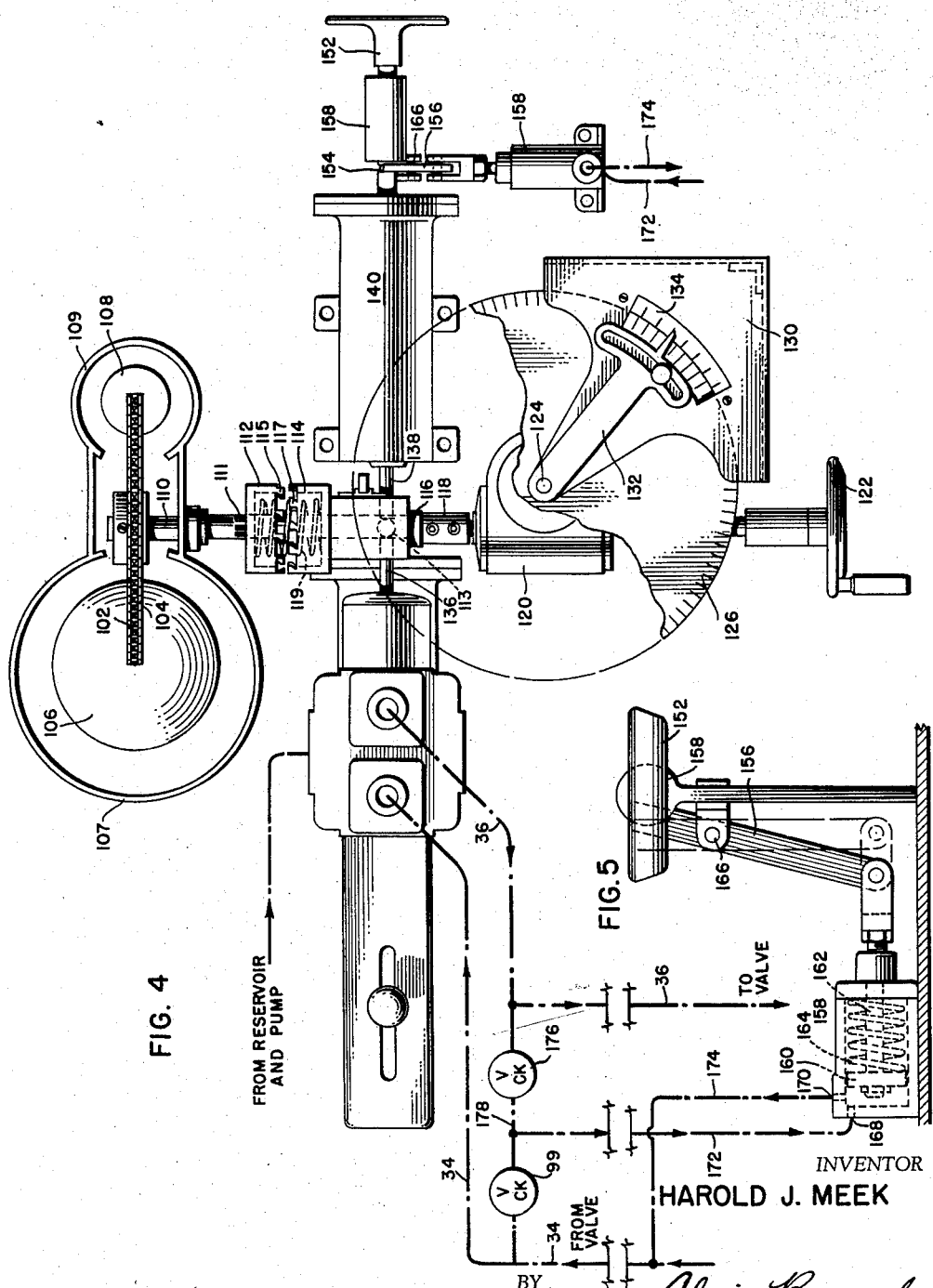
Fig. 4 is an enlarged plan view of the apparatus of Fig. 2.
Fig. 5 is a sectional view taken along the line 5—5 of Fig. 2, diagrammatically showing the hydraulic system connected with the apparatus of Fig. 4.

Although the present invention is directed primarily toward controlling the flow of fluid into marine vessels, it is understood that the invention may be applied whenever it is desired to control from a remote position the flow of fluid through a conduit.

Referring now to the drawings, the shell of the marine vessel or ship into which a fluid, such as gasoline, oil, or the like is adapted to be directed, is indicated at 10 and the deck of the ship is indicated at 12, the space between the shell 10 and deck 12 being generally known as the ship's hold. Extending into the hold of the ship is a fluid conduit 14 that is illustrative of the many conduits of the type that are adapted to convey liquid to tanks or receptacles located in the ship's hold. As shown, the fluid conduit 14 is supported by a standard 16 mounted on the shell 10, although it is understood that the fluid conduit 14 may be supported in any convenient manner. It is also seen that the fluid conduit 14 may be formed of any suitable material and may extend to any length of the ship or to any tank, as desired. Positioned at some convenient point in the conduit 14 and preferably located adjacent a point of entry into a fluid receptacle or tank in the hold of the ship is a valve assembly generally indicated at 18. The valve assembly 18 comprises a valve body 20 which has integrally formed thereon flanges 22 which are secured to similar flanges formed on the fluid conduit 14. Located within the valve body 20 is a valve 24 of any suitable design, the valve 24 being adapted to be reciprocated into and out of communication with the bore of the fluid conduit 14, thereby controlling flow of fluid through the conduit 14. Secured to a stem 26 that operatively engages the valve 24 is a bevel gear 28, the bevel gear 28 engaging a bevel gear 30. The bevel gear 30 is adapted to be rotated by a hydraulic motor that is indicated at 32, the hydraulic motor 32 being of the rotary type of any suitable construction. The hydraulic motor 32 may include an internal control (not shown) for preventing rotation of the rotor thereof when the valve 24 is fully opened, thereby preventing the threads of the stem 26 from jamming and being stripped. It is seen that upon rotation of the hydraulic motor 32, the bevel gear 28, engaging the bevel gear 30, will rotate the stem 26 that is operatively connected to the valve 24. Any suitable translation device (not shown) may be utilized with the valve stem 26 for causing the valve 24 to be raised or lowered into communication with the bore of the conduit 14 as desired, when the stem 26 is rotated by the motor 32. The valve shaft 26 also extends upwardly beyond the bevel gear 28, and into a housing 31 that forms part of a follow-up indicating system.

Communicating with the hydraulic motor 32 are fluid conduit lines 34 and 36 which are adapted to direct motive fluid to the motor 32 for effecting rotation of the motor in the desired direction. It is apparent that the fluid conduit lines also serve as exhaust passages for the motive fluid, the fluid conduit that is used as exhaust passage depending upon the desired direction of rotation of the motor 32. The fluid conduit lines 34 and 36 extend upwardly from the motor 32 and pass through the deck 12 of the ship. The conduits 34 and 36 communicate with a multi-way control valve generally indicated at 42, the multi-way control valve 42 being remotely positioned at any convenient point on the deck of the ship and being preferably located at a station which houses all the fluid conduit valve controls. It is seen, therefore, that it is desirable to position the multi-way control valve at such a point that the operator thereof may control several similar valves simultaneously, thereby controlling the loading or unloading of the fluid from the ship's tanks or receptacles with a minimum of effort and a maximum of control.

As shown in Figure 1, the multi-way control valve 42 comprises a housing 44 which has an internal cavity or chamber 46 formed therein. Slidably positioned within the control valve chamber 46 is a spool 48 which has lands 50, 52 and 54 formed thereon for controlling the flow of motive fluid to and from the fluid conduit lines 34 and 36. Cooperating with the lands 50 and 54 for controlling flow of fluid through the conduits 34, 36 are ports 56, 58, the ports being formed in the upper wall of the housing 44. In order to introduce motive fluid into the chamber 46 a fluid inlet port 60 is formed in the housing 44 and is positioned midway between the ports 56, 58. The inlet port 60 thus communicates with either the conduit 34 or conduit 36 through cavity 46 depending upon the desired direction of rotation of the motor 32 and consequently the direction of movement of the valve 24. The spool 48 is normally maintained in a neutral position whereby communication between the inlet port 60 and conduits 34 or 36 is blocked by the land 52 thereby causing the valve 24 to be held in the position to which it has been moved. A coil spring 62 is adapted to normally move the spool 48 to the neutral position and is located in the left side of the control valve housing 44 as seen in Fig. 1.

Motive fluid is introduced to the inlet port 60 through a fluid inlet conduit 64 that communicates therewith and that is connected to a source of motive fluid such as a fluid inlet header 65. The fluid inlet header 65 communicates with an hydraulic accumulator 66 that is adapted to provide a constant supply of motive fluid under pressure to the multi-way control valve 42. Located in the accumulator is a floating piston 68 that divides the accumulator into an upper pressure chamber 70 and a lower chamber 72. The upper chamber 70 of the hydraulic accumulator is adapted to be supplied with a gas medium under pressure, such as nitrogen, thereby precharging the upper chamber 70 to a predetermined pressure. The lower chamber 72 is adapted to have introduced therein the hydraulic motive fluid which is directed therein by a variable positive displacement pump 74. The pump 74 is driven by a motor 76 and is provided with a pressure holding device, whereby when the pressure of the fluid in the chamber 72 reaches a predetermined amount, depending upon the precharged pressure of the medium in the chamber 70, the pump 74 will float on the line, that is, it will not continue to pump motive fluid into the chamber 72. When the pressure in the chamber 72 falls below the predetermined pressure, the pressure holding device will then respond to cause the pump 74 to operate to supply the necessary amount of fluid to the chamber 72 until the predetermined pressure therein is again reached. The pressure holding device will then operate to cause the pump to once more float on the line. Communicating with the pump 74 through a fluid conduit line 78 is a reservoir 80 which receives the discharge fluid from the exhaust line 81 and passageway 83 by way of a fluid conduit line 82, the fluid conduit line 82 also communicating with other similar hydraulic systems throughout the ship.

The follow-up indicating system is only illustrated diagrammatically and includes a control handle 84 that is pivotally secured at 85 adjacent the extended end of the spool 48. The follow-up indicating system is more particularly described in copending application Serial No. 586,867, filed May 23, 1956, now Patent No. 2,888,029, and is adapted to indicate on a calibrated scale, not shown, the position of the actuating valve 24 in the conduit 14.

In order that the operator of the hydraulic control system may be constantly aware of the position of the valve 24 in the conduit 14, the follow-up indicating and control system is provided, and includes the housing 86 which defines a cylinder and in which is located a piston 88. Secured to the piston 88 is a rod 90 that extends through an end wall 92 of the cylinder 86, the outer end of the rod 90 being pivotally connected at 93 to the lower end of handle 84. A coil spring 94 encircles the rod 90 within the cylinder 86, abutting against the piston 88 and the inner surface of the end wall 92, and thereby normally biasing the piston 88 toward the right as seen in Figure 1. Resisting the movement of the piston 88 to the right is a bellows 96 that bears against the other surface of the piston and against the other end wall 98 of the cylinder 86. Communicating with the interior of the bellows 96 is a hydraulic fluid conduit 100 connected thereto. Connected to the opposite end of the conduit 100 is the housing 31, which encloses a similar bellows, thereby defining a closed fluid system. A hydraulic fluid is disposed in the closed fluid system.

In describing the operation of the hydraulic system as described to this point, it is first assumed that the valve 24 is closed. The control handle 84 is moved to the open position. The spring 62 is expanded, spool 48 is moved to the right and motive fluid is directed to the conduit 34 by way of conduit 64, port 60 and port 56. Simultaneously, fluid is exhausted through conduit 36, port 58, passage 83 and exhaust conduit 81. The position of the valve 24 is instantaneously indicated by the follow-up indicating system, the rod 29 moving upwardly in response to rotation of shaft 26 thereby compressing the bellows in housing 31 and forcing hydraulic fluid into bellows 96, thereby moving the piston 88 and rod 90 to the left. The pivot point 93 is shifted accordingly, and the handle 84 is moved steadily to the right about pivot point 85 as the valve 24 opens. When the handle 84 reaches the fully open position, additional movement of the rod 90 to the left then moves the spool 48 to the left to cause the spool land 52 to lap the port 60 and stop the flow of fluid to motor 32. The operator then releases handle 84 and the spring 62 shifts the handle 84 slightly so that the control valve 42 is then located again in neutral position.

With the valve 24 in the open position, liquid will flow through the inlet conduit 14 to fill a tank located in the hold of the ship. When the tank is filled to the desired level, heretofore the control handle was shifted in the opposite direction manually, thereby closing the valve 24.

According to the present invention, the closing of the valve 24 is accomplished automatically by use of the measuring apparatus and operating device to be described hereafter.

Operationally connected to the spool 48 of the valve 42 is a measuring apparatus best illustrated in Figures 3 and 4 and an operating device shown in Figures 2 and 5. As shown in the plan view of Figure 4, the measuring apparatus is positioned perpendicularly to the axis of the spool 48 whereas the operating device is positioned along the same axis as that of the spool 48. The measuring device indicates the liquid level in the tank when its clutch is disengaged. When its clutch is engaged, it is preset to the desired liquid level, and the operating device is actuated when this preset liquid level in the tank has been reached.

The measuring device includes a sprocket 102 over which passes a chain 104 having a float 106 suspended at one end thereof and a weight 108 suspended on the other end. The float 106 is housed in a float housing 107 and the weight 108 is housed in a weight housing 109. The housings prevent swinging of the suspended float and weight. The weight 108 is preferably equal to the weight of the chain 104 and acts as a counter balance so that only the weight of the float 106 is effective. The sprocket 102 is mounted on a shaft 110 to which is attached by splines 111 the clutch part 112. The clutch part 112 which cannot move along the length of the shaft 110 is provided with teeth 115 which have angular contact faces. A spindle sleeve 114 is loosely located on shaft 110 adjacent to the clutch 112 and is likewise provided with teeth 117 adapted to engage the teeth 115. The sleeve 114 can be moved longitudinally along the shaft 110 by manual means such as by a lever which can be attached thereto. The clutch part 112 and sleeve 114 are biased apart by a spring 119 which tends to disengage the teeth. The torque on the shaft 110 resulting from the weight of the float suspended from the sprocket 102 acting on the angular contact faces tends to force the teeth into deeper engagement. Thus, when the teeth of the sleeve 114 are manually moved into engagement with the teeth of the clutch part 112, the torque due to the weight of the float overcomes the spring pressure and maintains the teeth in engagement. Decreased torque reduces this engagement force to a magnitude which is insufficient to restrain the spring 119, whose function is to disengage the teeth. A trigger lever 113 is attached to the spindle sleeve 114 at a point corresponding to the center line of the axis of the spool 48 and the operating device. Also mounted on the shaft 110 is a thrust bearing 116, a sleeve coupling 118, a worm gear reducer 120 and a hand crank 122. This is a conventional arrangement as illustrated in Boston Gear Catalog No. 56, copyright 1956, on pages 271, 418 and 460. A shaft 124 is operationally connected to the gear reducer 120 and extends therefrom at an angle perpendicular to that of the shaft 110. Mounted on the shaft 124 is the indicator 126. The indicator 126 is graduated along its circumference to indicate the liquid level in the tank. The shaft 110 is supported adjacent the crank 122 by a bracket 128. An indicator bracket 130 is provided as is a movable reference arm 132. A scale 134 is mounted on the indicator bracket 132. The scale 134 is a gravity indicator and preferably has a range of 0.7–1.0. This is used to correct the readings for differences in the specific gravity of the liquid which is being measured.

Thus, when the clutch part 112 is not engaged with the sleeve 114, the device functions as a highly accurate tank gauge which can be corrected for variations in specific gravity by shifting the movable reference arm 132 along the calibrated gravity scale 134. The depth of fluid being gauged may then be read at any time directly from the ullage indicator dial 126.

The measuring apparatus described above is mounted at right angles to the axis of the spool 48 of the control valve with its shaft 110 at a higher level than the axis of the spool 48. The trigger lever 113 depends from the spindle sleeve 114 and extends across the axis of the valve spool 48. The trigger lever 113 is mounted between an extension 136 of the valve spool 48 and the piston shaft 138 of the operating device. The operating device includes a cylinder 140 which houses two pistons 142 and 144 separated by a spring 146. The piston shaft 138 is attached to the piston 142 and extends out of the left end wall of the cylinder 140 and a piston shaft 148 attached to the piston 144 extends out of the right end wall of the cylinder 140. The piston shaft 148 is supported by a bracket 150. The shaft 148 is provided with an area 154 of reduced diameter adapted to be engaged by the upper end of a latch lever 156. At the end of the shaft 148 is mounted a handle 152 which is utilized for reciprocating the shaft 148 to the left to compress the spring 146 and to latch the shaft 148.

A latch release mechanism which is used to unlatch shaft 148 and allow spring 146 to become decompressed is best illustrated in Fig. 5 and includes a latch release cylinder 158 which houses a piston 160 attached to one end of a piston rod 162. The piston rod 162 passes through an end wall of the cylinder 158 and is pivotally attached at its other end to the lower end of latch lever 156. A spring 164 is housed between the piston 160 and the end wall of the cylinder 158. The latch lever 156 is pivoted at an intermediate point 166. In its normal position, the piston rod 162 is in the full line position of Fig. 5 with the upper end of the latch lever 156 in engagement with the reduced area 154 of the shaft 148. Thus, it can be seen that when the shaft 148 is moved to the left as seen in Fig. 2, the spring 164 in the cylinder 158 will force the latch lever 156 into engagement with the reduced diameter 154 of the shaft 148 and thus retain it in the cocked position.

The latch release cylinder 158 is provided with an inlet port 168 and an outlet port 170 for receiving motive fluid when it is to be actuated. The inlet port 168 is connected by conduit 172 through a torque limit relief valve 176 to conduit 36 which conducts motive fluid to the valve actuating motor 32 during the closing of valve 24. The outlet port 170 is connected by conduit 174 to conduit 34 which directs motive fluid from the motor 32 during the closing of the valve 24. A pressure relief valve 99 is located in conduit 178 which connects conduits 34 and 36.

The operation of the entire device in automatically closing the valve 24 at the desired liquid level will now be described. Hand crank 122 is turned, thus simultaneously raising the float 106 and indicating a reading on the ullage indicator 126. When the desired level of liquid as indicated on the indicator 126 is shown, the sleeve 114 is manually moved along the shaft 110 until the teeth of the sleeve 114 and the teeth of the clutch part 112 are in engagement in opposition to the pressure of the spring 119. By releasing the hand crank 122, the weight of the float 106 which is now suspended above the liquid level in the tank, acts to exert a torque on the clutch part 112 and sleeve 114 which overcomes the pressure of the spring 119 and maintains the teeth in engagement at the desired level of the float 106. In this condition, a counter-clockwise turning moment is imposed on sprocket 102 by the weight of the float 106 which is suspended in the float housing 107 at the desired fluid level in the tank. The resulting torque on shaft 110 not only acts to maintain engagement of the teeth 115 and 117 of the clutch arrangement, but also is transmitted through clutch 112 and spindle sleeve 114 to trigger lever 113 which in turn exerts an impressed pressure through piston rod 138 and restrains the action of the spring 146 in actuating cylinder 140. This spring is then compressed by forcing the locking handle 152 to the left and shaft 148 into engagement with the latch lever 156.

When the liquid in the cargo tank in the hold reaches the preselected level shown on ullage indicator 126, flotation of the float 106 on the surface of the liquid removes the turning moment and torque from the sprocket 102, which allows clutch part 112 to disengage under the influence of spring 119 and to release the trigger lever 113, permitting the spring 146 in the actuating cylinder 140 to force the rods 138 and 136 to the left (Fig. 2) thus moving the spool 48 in the control valve 42 to the left, thereby directing hydraulic fluid to cause closing of the cargo valve 24 in the hold. Motive fluid is directed to the conduit 36 by way of conduit 64, port 60 and port 58. Simultaneously, fluid is exhausted through conduit 34, port 56, passage 83, and exhaust conduit 81. When the cargo valve 24 reaches a fully closed position, the pressure of the fluid builds up until torque limit relief valve 176 opens. For example, the torque limit relief valve 176 is set to open at 1000 lbs. pressure and the second relief valve 99 is set to open at 100 lbs., thus supplying pressure fluid to supply the latch release cylinder 158 through conduit 172 and port 168. The fluid exhausts through port 170 and conduit 174.

The pressure of the motive fluid on the piston 160 causes it to move to the right (Figure 5) against the action of spring 164 to shift the latch lever 156 out of contact with the shaft 148. This in turn releases the pressure on the spring 146 in actuating cylinder 140 and on the rods 138 and 136 and spool 48. The spool 48 which is spring centered by spring 62 will thus return to the neutral position closing off inlet port 52.

What is claimed is:

1. A float actuating means comprising a shaft, a float suspended from said shaft and so mounted that the weight of said float transmits a torque to said shaft, said float extending downwardly into a space to be filled with a liquid up to the level of said float, a clutch part secured to said shaft for rotation therewith, a sleeve loosely mounted on said shaft adjacent said clutch part, interengaging sets of teeth on said clutch part and said sleeve whereby when said clutch part and said sleeve are interengaged said shaft and said sleeve rotate together, resilient means mounted between said clutch part and said sleeve acting to disengage said sleeve from said clutch part, said sets of teeth being so shaped that the torque imposed on said shaft by the weight of said unsupported float tends to overcome the action of said resilient means and maintain said teeth in engagement and when said liquid level engages said float to remove said torque, said resilient means acts to disengage said teeth, and means attached to said sleeve for actuating a device upon disengagement of said teeth thereby releasing said sleeve from said clutch part when the liquid level in said space rises to engage said float and overcome the torque due to the weight of said float.

2. A float actuating means comprising a shaft, a sprocket mounted on said shaft, a chain in engagement with said sprocket, a float attached to one end of said chain, said one end of said chain and float extending into a space to be filled with a liquid up to the level of said float, the weight of said float transmitting a torque to said shaft, a clutch part secured to said shaft for rotation therewith, a sleeve loosely mounted on said shaft adjacent said clutch part, interengaging sets of teeth on said clutch part and said sleeve whereby when said clutch part and said sleeve are interengaged said shaft and said sleeve rotate together, resilient means mounted between said clutch part and said sleeve acting to disengage said sleeve from said clutch part, said sets of teeth being so shaped that the torque imposed on said shaft by the weight of said unsupported float tends to overcome the action of said resilient means and maintain said teeth in engagement and when said liquid level engages said float to remove said torque, said resilient means acts to disengage said teeth, and means attached to said sleeve for actuating a device upon disengagement of said teeth thereby releasing said sleeve from said clutch part when the liquid level in said space rises to engage said float and overcome the torque due to the weight of said float.

References Cited in the file of this patent

UNITED STATES PATENTS

| | | |
|---|---|---|
| 607,286 | Sharp | July 12, 1898 |
| 1,058,238 | Hixon | Apr. 8, 1913 |
| 1,144,849 | Kingberry et al. | June 29, 1915 |
| 1,327,999 | Hill | Jan. 13, 1920 |
| 1,529,218 | Sandwell | Mar. 10, 1925 |
| 2,192,963 | Davis | Mar. 12, 1940 |
| 2,261,494 | Elverston | Nov. 4, 1941 |
| 2,464,456 | McGillis et al. | Mar. 15, 1949 |
| 2,594,664 | Livers et al. | Apr. 29, 1952 |
| 2,814,303 | Fifer | Nov. 26, 1957 |